US006173863B1

(12) United States Patent
Brozell et al.

(10) Patent No.: US 6,173,863 B1
(45) Date of Patent: Jan. 16, 2001

(54) PUMP DISPENSER HAVING A PLUNGER SEAL

(75) Inventors: Leonora M. Brozell, Toledo; Richard C. Sayers, Perrysburg; Anthony M. DiVitto, Waterville, all of OH (US)

(73) Assignee: Owens-Illinois Closure Inc., Toledo, OH (US)

( * ) Notice: Under 35 U.S.C. 154(b), the term of this patent shall be extended for 0 days.

(21) Appl. No.: 09/369,873

(22) Filed: Aug. 9, 1999

(51) Int. Cl.[7] .................................................... G01F 11/00

(52) U.S. Cl. ............................ 222/1; 222/321.9; 222/385

(58) Field of Search ......................... 222/1, 321.1, 321.7, 222/321.9, 380, 385

(56) References Cited

U.S. PATENT DOCUMENTS

| | | | |
|---|---|---|---|
| 2,362,080 | 11/1944 | Martin | 222/321 |
| 3,128,018 | 4/1964 | Corsette et al. | 222/321 |
| 3,191,814 | 6/1965 | Corsette et al. | 222/384 |
| 3,248,021 | 4/1966 | Corsette et al. | 222/321 |
| 3,362,344 | 1/1968 | Duda | 103/188 |
| 3,949,906 | 4/1976 | Pettersen et al. | 222/153 |
| 5,158,211 | 10/1992 | Meshberg | 222/153 |
| 5,392,962 | 2/1995 | Meshberg | 222/321 |
| 5,549,223 * | 8/1996 | Hori | 222/321.9 |
| 5,725,128 * | 3/1998 | Foster | 222/321.9 |
| 5,775,547 * | 7/1998 | Foster et al. | 222/321.9 |
| 5,850,948 | 12/1998 | Garcia et al. | 222/321.9 |
| 6,053,371 * | 4/2000 | Durliat et al. | 222/321.9 |
| 6,082,593 * | 7/2000 | Borcherds | 222/321.9 |

* cited by examiner

*Primary Examiner*—Joseph A. Kaufman

(57) ABSTRACT

The dispenser comprises a plunger operating in a hollow body. The body has formed adjacent its upper end an inward and downward annular flap. Below the flap is a vent hole. The plunger stem has a tapered zone leading to a greater diameter above the tapered zone. When the plunger is in its lockdown position, the flap cooperates with the greater diameter to provide a vent seal.

5 Claims, 1 Drawing Sheet

PUMP DISPENSER HAVING A PLUNGER SEAL

FIELD OF THE INVENTION

This invention relates to a pump dispenser in which a plunger having an actuator top reciprocates inside a hollow cylindrical body. More specifically, this invention relates to such a dispenser in which, at the bottom of the plunger stroke and in a lockdown condition, a seal closes off a vent hole.

BACKGROUND OF THE INVENTION

The U.S. patent application Ser. No. 09/079,481 filed May 15, 1998, now U.S. Pat. No. 6,053,371 assigned to our assignee, discloses a meritorious liquid dispenser comprising a hollow body and a one-piece plunger including an actuator portion and piston portion. The disclosure of this patent application is incorporated hereinto by reference. The plunger includes a stem and an enlarged piston head at its lower end. Between the stem and head is formed an upwardly facing shoulder. Inlet and outlet check valves are provided and a spring urges the plunger upward. The body has near the upper end an internal inward and downward flap which, when engaged by the shoulder, stops upward movement of the plunger. A vent hole is formed in the body. The flap, being above the vent hole, is in position to seal venting. While the arrangement of the patent application is indeed meritorious, there has been a need for an improved vent seal particularly in lockdown position.

SUMMARY OF THE INVENTION

The invention is, of course, described in the claim language appended hereto. In summary, under the present invention, the stem of the plunger is formed with a tapered zone enlarging in an upward direction to a wider diameter portion. For the majority of travel of the plunger, the flap barely contacts the stem. As the plunger approaches lockdown position, near the end of the stroke, however, the flap engages the taper and then the wider diameter in an interference fit and achieves a seal.

The flap thus does double duty: as a stop as described in said patent application and as a seal. As a stop the flap protrudes enough toward the stem to serve as a wiper and to engage the shoulder as described to limit upward movement of the plunger and, incidentally, to effect a seal between flap and shoulder in top position. In the lockdown position the flap firmly engages the wider diameter to effect a seal.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 2:
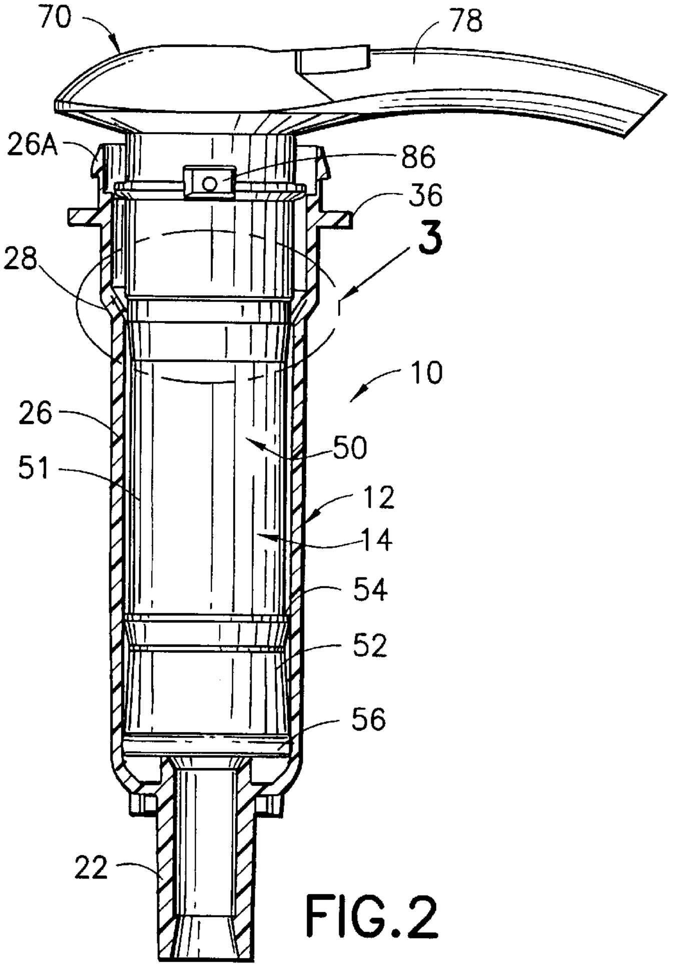
FIG. 2 is a partly sectional view of an assembled pump dispenser embodying the invention.

A pump dispenser embodying the invention is generally designated 10 in FIG. 2. It comprises a hollow cylindrical body 12 and a cooperating one-piece plunger 14.

Referring more specifically to the body 12, it is essentially cup-shaped including a bottom wall 18 which is centrally formed with an inlet opening 20 surrounded by a downward tubular connector 22 receiving a dip tube (not shown). Above the opening 20 is formed an upward bevelled annular seat 24. A cylindrical sidewall 26 extends upward from the perimeter of bottom wall 18 and terminates in a circular mouth 26A.

Figure 1:
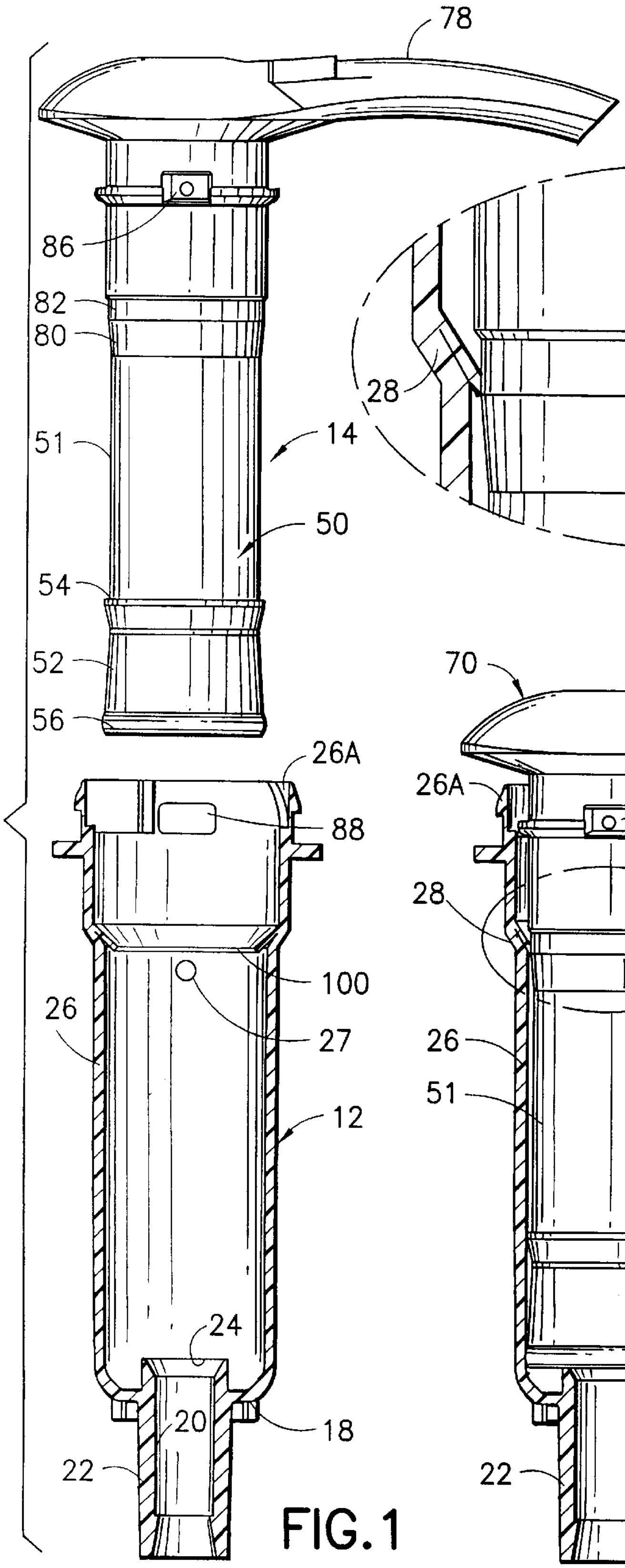
FIG. 1 is an exploded partly sectional view of the plunger and the body of a dispenser embodying the invention.

The sidewall 26 (FIG. 1) extends upward and is formed with a vent opening 27. Above the vent opening the sidewall is formed with an outward step 28 (FIG. 2). Outward from the sidewall extends an integral annular flange 36. A closure (not shown, but shown in the said patent application) engages the flange in the usual way. In use, the closure is attached to a container with the body 12 of the pump disposed in the neck of the container.

The plunger 14 comprises an elongate tubular piston 50. The piston 50 is defined by a stem 51 and an enlarged tubular piston head 52 at the lower end of the stem. Intermediate the head and the stem there is formed an annular upward shoulder 54. The lower end of the head is formed with an annular seal 56 sealingly engaging the inside of the sidewall 26 of the body 12. The plunger 14 is tubular, formed with an axial passage (not shown).

At the upper end of the plunger 14 and unitary therewith is the actuator 70. The actuator 70 is formed therein with a check valve compartment (not shown). A laterally extending portion of the actuator 70 forms the spout 78 having a discharge passage (not shown).

Both the body 12 and the plunger 14 are molded of a plastic which is resilient in thin sections and rigid in thick sections. The resilience in thin sections is used to advantage in the piston seal 56 and in the flap 100 adjacent the sidewall 28, to be explained.

The valving for the dispenser comprises an inlet ball check (not shown but shown in the patent application) which seats on seat 24 at the lower end of the body 12, and the discharge ball check (not shown). A spring (not shown) is compressively disposed between the bottom wall 18 of the body and urges the plunger upward.

The operaton of the pump dispenser is as well known in the art exemplified by the said patent application.

The body 12 is formed at the stop 28 with an annular inward and downward sealing and retaining flap 100.

In the assembly of the pump (FIG. 1) the plunger 14 is inserted into the body 12. The lower end of the piston head 52 engages the upper side of flap 100. Further insertion spreads the flap, and as the shoulder 54 (FIG. 1) of the piston passes the flap 100, the flap 100 snaps inwardly toward the side of the stem 51 of the piston. Any attempt at accidental or intentional retraction of the plunger, will be stopped as the shoulder 54 on the piston engages the distal edge of the flap 100. The flap thus becomes a lock, entrapping the plunger in the body. The engagment also provides a seal between plunger and shoulder at the upper end of the plunger stroke. Between upper and lower limits, the flap lightly engages the stem to function as a wiper for the lotion adhered thereto.

The dispenser is shipped in lockdown condition. Spaced below the finger-engaging portion of the actuator 70, the plunger is formed with lateral lugs 86 which cooperate with bayonet channels 88 to lock down the plunger 14 in shipment and when it is not being used.

Figure 3:
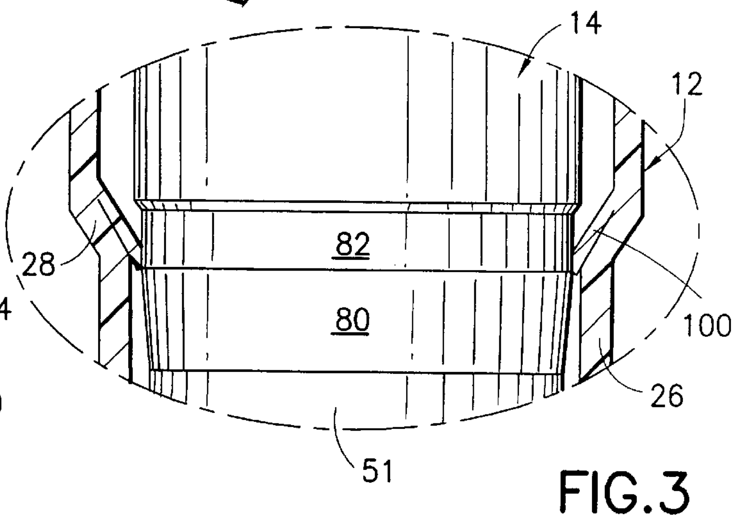
FIG. 3 is an enlarged fragmentary sectional view of a portion of FIG. 3.

The stem 51 is formed with a tapered zone 80 (FIG. 3) which grows greater in diameter as the upper end of the plunger is approached. Above the zone 80 the plunger has a wider diameter portion 82, wider than below the zone. When the flap engages this part of the stem, there is a definite interference fit.

Thus, when the plunger is locked down, the flap scalingly engages the wider diameter zone 82. Because the flap 100 is above the vent hole 27, this engagement seals against liquid in the container when upset from working through the vent hole, between plunger and body and out the top of the dispenser.

Thus, the flap 100, molded integrally with the body 12, functions as: (1) a stop for limiting the upward travel of the plunger and preventing its removal from the body and by encountering the shoulder and also incidentally serves as a seal between body and plunger at the top of the stroke; (2) a wiper for removing lotion adhered to the stem; (3) a seal for the vent hole when the plunger is in the lockdown position.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. In a pump dispenser comprising:

a. a resilient molded hollow body having integrally molded adjacent its upper end a downwardly directed annular flap, the flap having an annular distal end, the body having a vent hole below the flap, b. a resilient molded plunger operating in the body and having upper and lower ends and having at its lower end a piston head sealingly engaging the inside of the hollow body and having an inward upwardly facing annular shoulder and an elongated stem reduced in diameter above the head, the flap engaging the stem, the improvement of a tapered zone in the stem spaced above the shoulder, the zone increasing in diameter approaching the upper end of the plunger, the stem being of greater diameter above the tapered zone and adapted to be engaged by the flap in sealing engagement.

2. A pump dispenser as claimed in claim 1 wherein the flap is thicker in cross-section as the distal end is approached.

3. A pump dispenser for installing in a container mouth comprising:

a cup-shaped body having a sidewall with a vent hole therein, a tubular piston operating in the body, a downward annular flap molded unitarily with the body and disposed above the vent hole, the piston having a reduced stem with a tapered zone in the stem leading up to an enlarged diameter adapted to be engaged by the flap in sealing arrangement to close the vent hole.

4. A pump dispenser as claimed in claim 3 wherein the flap narrows in thickness as the sidewall is approached.

5. A method of sealing a vent in a pump dispenser comprising a cup-shaped body having a vent hole, and a tubular piston having a stem and operating in the body, the body having an integral annular inward flap above the vent hole, the method including the steps of:

(a) providing a tapered zone on the stem of the piston leading to an enlarged diameter above the tapered zone, and (b) engaging the flap with the enlarged diameter to create a seal for the vent hole.

* * * * *